(12) United States Patent
Trombotto

(10) Patent No.: US 12,460,691 B2
(45) Date of Patent: *Nov. 4, 2025

(54) FRICTION MATERIAL

(71) Applicant: ITT Italia S.r.l., Lainate (IT)

(72) Inventor: Flavio Trombotto, San Pietro val Lemina (IT)

(73) Assignee: ITT ITALIA S.R.L., Lainate (IT)

( * ) Notice: Subject to any disclaimer, the term of this patent is extended or adjusted under 35 U.S.C. 154(b) by 906 days.

This patent is subject to a terminal disclaimer.

(21) Appl. No.: 17/693,933

(22) Filed: Mar. 14, 2022

(65) Prior Publication Data

US 2022/0205505 A1 Jun. 30, 2022

Related U.S. Application Data

(63) Continuation-in-part of application No. 14/420,244, filed as application No. PCT/IB2013/056469 on Aug. 7, 2013, now Pat. No. 11,274,720.

(30) Foreign Application Priority Data

Aug. 7, 2012 (IT) .......................... TO2012A000713

(51) Int. Cl.
F16D 69/02 (2006.01)

(52) U.S. Cl.
CPC .... F16D 69/026 (2013.01); *F16D 2200/0065* (2013.01); *F16D 2200/0069* (2013.01); *F16D 2200/0073* (2013.01)

(58) Field of Classification Search
CPC ........... F16D 69/026; F16D 2200/0065; F16D 2200/0069; F16D 2200/0073; F16D 2200/006
See application file for complete search history.

(56) References Cited

U.S. PATENT DOCUMENTS

| | | | | |
|---|---|---|---|---|
| 4,279,696 A * | 7/1981 | Piersol | ................... | D21H 23/48 162/146 |
| 5,383,963 A * | 1/1995 | Kobayashi | ........... | C01G 23/005 106/36 |
| 5,891,933 A | 4/1999 | Kesavan | ................ | C04B 14/305 428/293.4 |
| 6,455,145 B1 | 9/2002 | Mizuno et al. | | |
| 6,632,857 B1 | 10/2003 | Nakajima et al. | | |
| 2001/0005547 A1 | 6/2001 | Hikichi | ..................... | C08K 7/00 428/293.1 |
| 2001/0024917 A1 | 9/2001 | Ogata | ................. | F16D 65/0006 442/97 |
| 2002/0012783 A1 | 1/2002 | Hikichi et al. | | |
| 2002/0034623 A1 | 3/2002 | Hikichi et al. | | |
| 2002/0169231 A1 | 11/2002 | Okayama | ................ | C22C 49/14 523/156 |
| 2003/0026969 A1 * | 2/2003 | Nagata | ..................... | F16D 69/02 428/292.1 |
| 2004/0030000 A1 | 2/2004 | Takeuchi | ............... | F16D 69/026 523/155 |
| 2004/0241429 A1 * | 12/2004 | Suzuki | ................... | F16D 69/026 428/323 |
| 2005/0004258 A1 | 1/2005 | Yamamoto | ............ | F16D 69/026 523/149 |
| 2007/0219289 A1 * | 9/2007 | Phipps | ................... | F16D 69/026 523/155 |
| 2008/0156226 A1 | 7/2008 | Kitami | .................. | F16D 69/026 106/36 |
| 2009/0011962 A1 * | 1/2009 | Chinda | .................. | F16D 69/026 508/216 |
| 2010/0084233 A1 | 4/2010 | Subramanian | ........ | F16D 69/026 188/251 A |

FOREIGN PATENT DOCUMENTS

| | | |
|---|---|---|
| CN | 101 823 856 A | 9/2010 |
| EP | 0 482 204 A1 | 4/1992 |
| EP | 1 227 262 A1 | 7/2002 |
| GB | 2 016 027 A | 9/1979 |

OTHER PUBLICATIONS

Akbarazadeh et al, Synthesis and Characterization of Molyodenum Disulfide Composite Coating on Steel Using Chemical Vapor Deposition, Archives of Metallurgy and Materials, vol. 63, Issue 2, pp. 555-562, 2018.*
International Search Report and Written Opinion for PCT/IB2013/056469; dated Dec. 5, 2013; 10 pages.
Brazilian Preliminary Office Action for BR112015002478-5; dated Nov. 25, 2019; 5 pages.
Mexican Office Action for MX/a/2015/001759; dated Mar. 13, 2020; 3 pages.
Brazilian Written Opinion for BR112015002478-5; dated Jun. 29, 2020; 7 pages.
Akbarazadeh et al, Synthesis and Characterization of Molybdenum Disulfide Composite Coating on Steel Using Chemical Vapor Deposition, Archives of Metallurgy and Materials, vol. 63, Issue 2, pp. 555-562, 2018.

* cited by examiner

Primary Examiner — Alexander C Kollias
(74) Attorney, Agent, or Firm — Barclay Damon LLP

(57) ABSTRACT

An asbestos-free organic friction material, in particular for producing brake pads and shoes for vehicles made up of a composition or mixture having a fibrous base, a filler, an organic binder and optional metal oxides. The composition is completely free of copper and copper compounds or alloys and includes in the fibrous base, together with inorganic and/or organic fibers, from 1% to 10% by volume, calculated relative to the total volume of the composition, of stainless steel fibers. The friction material further includes between 1% and 25% by volume of a system of fibrous oxides consisting of potassium hexatitanate and zirconia.

10 Claims, 4 Drawing Sheets

FRICTION MATERIAL

CROSS-REFERENCE TO RELATED APPLICATIONS

This application is a continuation in part of U.S. patent application Ser. No. 14/420,244, entitled FRICTION MATERIAL, filed Feb. 6, 2015, which is a national stage application under provisions of 35 U.S.C. § 371 of International Application No. PCT/IB2013/056469, filed Aug. 7, 2013, which claims priority of Italian Patent Application No. TO2012A000713, filed Aug. 7, 2012, the entire contents of each application being herein incorporated by reference.

TECHNICAL FIELD

The present invention relates to an asbestos-free friction material, and in particular a friction material of the type known as NAO ("Non Asbestos Organic"), i.e. asbestos-free organic friction.

In particular, the invention relates to an asbestos-free organic friction material adapted for use as a friction material for automobile brakes and other similar applications (for example, clutch disks), generally in the automotive field because of the good resistance to wear, the mildness with reference to the mating surfaces (within the field of brakes for vehicles, the surface of the brake disk or drum), which makes it possible to avoid scoring of the mating surface, and adequate braking capacity (friction stability, in particular at high temperature).

STATE OF THE ART

The friction materials used as brake shoes for drum brakes and as brake pads in disk brakes for vehicles and other equipment (for example, clutch disks), comprises a base made of a fibrous material, a binder and a filler. In the past, asbestos was used in relatively large measure as a fibrous material, but presented considerable environmental problems and had well known toxic effects on human health, and for this reason has been banned by legislation for some time. Therefore, asbestos was replaced by other materials, both inorganic, like rock wool, wollastonite, fiberglass, and organic, like aramid fiber and carbon fiber, as well as metallic, such as fibers or powder of copper, tin, iron, aluminum and other metals or alloys, such as bronze or brass. The binder is a thermosetting polymer, usually phenolic-resin based. Various materials are used as the filler, such as baryte (barium sulfate), calcium carbonate, magnesium oxide, talc, zirconium silicate, zirconia, mica, metal pulverulents, molybdenum disulfide, rubber (powder or granules), and graphite. In particular, it has been found that graphite and molybdenum bisulfide improve the resistance to wear.

EP1227262 discloses a friction material of the type described above, including approx. 10% by volume of copper fiber as the fibrous material and 0.1 to 15% by volume of tin and/or tin sulfide for the purpose of eliminating the use of antimony compounds while still preserving good resistance to wear, especially at high temperature.

EP482204 also discloses a friction material of the type described above including from 4 to 9% by volume of bronze fibers, which resolves the problem of avoiding attachment or "gluing" of the brake shoe or brake pad to the contact surface of the disk or drum during use via the simultaneous presence of a mixture of three (3) tin compounds (including metallic tin) that are different from each other and have different melting points.

Nevertheless, for the purpose of preserving the atmosphere and avoiding possible damage to human health, the various national and international standards impose more and more frequently the use of friction materials that are not only free of asbestos and heavy metals but that also have a reduction or complete elimination of copper (standards already approved by some American states and that will enter into force in the coming years).

Therefore, in the art the necessity exists of providing a friction material free of asbestos, heavy metals and copper, but at the same time preserving performances at least comparable to those of friction materials that include such substances.

SUMMARY OF THE INVENTION

An object of the present invention is to provide an asbestos-free organic friction material free of copper and copper compounds, such as bronze and brass, capable of overcoming the disadvantages of the prior art and exhibiting braking performances comparable to those of an asbestos-free organic friction material containing copper.

The invention is therefore related to a friction material free of asbestos.

In particular, the friction material according to the invention is formed by a composition or mixture comprising a fibrous base, a filler and an organic binder, is completely free of copper and copper compounds or alloys, but includes in the fibrous base together with inorganic and/or organic fibers from 1% to 10% by volume, calculated on the total volume of the composition of stainless steel fibers, for example the classic UNI X 10 Cr Ni 1808 (known as "inox 18-8") or the equivalent stainless steel, 10% (by weight) of Ni (known as "inox 18-10"). The friction material further includes optional metal oxides, wherein the only optional metal oxides in the non-asbestos organic friction material are selected from the group consisting of magnesium oxide, molybdenum trioxide, iron oxide and combinations thereof.

The friction material according to the invention also contains from 1% to 25% by volume of a "system of fibrous oxides", according to the invention based on a metallic titanate, preferably potassium hexatitanate ($K_2Ti_6O_{13}$) or other titanates of potassium and/or sodium, added with zirconia (which, per se', is not a fibrous material), in variable proportions.

In particular, in the composition or mixture making up the friction material according to the invention, the ratio between the percentage content by volume of zirconia and of the titanate (in particular of potassium hexatitanate) is between 1:1 and 1:2. According to at least one embodiment, the ratio between the percentage content by volume of the zirconia and potassium hexatitanate in the system of fibrous oxides is between 1:1.3 and 1:2.

Furthermore, the ratio between the percentage content by volume of stainless steel fibers and the sum total of the percentage content by volume of zirconia and titanate must be between 1:4 and 1:8. In at least one embodiment, the ratio between the percentage content by volume of stainless steel fibers to the sum total of the zirconia and potassium hexatitanate is between 1:7 and 1:8.

The composition of the friction material utilized to form the asbestos-free organic friction material of the invention may comprise from 0% to 10% by volume of solid lubricants, such as tin sulfides, like SnS and $SnS_2$.

It is also desirable to include graphite and/or coke in the composition.

The graphite can be any known graphite commonly utilized in friction materials.

The graphite (and/or coke) is added in an appropriately selected quantity, which preferably comprises between 2% and 15% by volume of the total composition of friction material.

The other components of the composition of the friction material can be components utilized in friction materials already known in the art.

In particular, the rest of the fibrous base can be any organic fiber or inorganic fiber other than asbestos that is commonly used in friction materials. Exemplary embodiments include inorganic fibers, such as glass fibers, rock wool, wollastonite, sepiolite and attapulgite, and organic fibers, such as carbon fibers, aramid fibers, polyimide fibers, polyamide fibers, phenolic fibers, cellulose and acrylic fibers or PAN (polyacrylonitrile).

The fibrous base can be utilized in short fiber or powder form.

It is preferable that the fibrous base, and in particular the stainless steel fibers used, has a total fiber length of between 0.5 and 1.5 mm and a fiber diameter from 40 to 150 microns.

Numerous materials known in the art can be used as organic or inorganic fillers. For example, the filler can be selected from the group consisting of: calcium carbonate precipitate, barium sulfate, magnesium oxide, calcium hydroxide, calcium fluoride, slaked lime, talc, molybdenum trioxide, zirconium silicate, iron oxide, mica, iron sulfide, silicon dioxide, vermiculite, rubber powder (rubber powder and granules), nitrile rubber powder (vulcanized product), metal powders (excluding copper and its alloys), acrylic rubber powder (vulcanized product). According to at least one embodiment, the filler is selected from the group consisting of: calcium silicate, rock wool, calcium carbonate, barium sulfate, calcium hydroxide, calcium fluoride, slaked lime, talc, mica, and vermiculite as well as combinations thereof.

These fillers can be used by themselves or in combinations of two or more of them. The quantity of such fillers is preferably comprised from 2% to 40% by volume based on the total composition of the friction material.

The binder can be any known binder commonly used in friction materials.

Exemplary embodiments of suitable binders include phenolic resins, melamine resins and epoxy resins; various modified phenolic resins, such as epoxy-modified phenolic resins, oil-modified phenolic resins, alkylbenzene-modified phenolic resins and acrylonitrile butadiene rubber (NBR).

Any one of these compounds or combination of two or more of them may be used. The binder is included in a quantity preferably from 2% to 30% by volume based on the total composition of the friction material.

According to another aspect of the invention, the friction material according to the invention, in addition to stainless steel fibers, may also include zinc fibers having a total length of between 0.2 and 1.5 mm, total diameter of between 50 and 250 μm in a total quantity of between 1 and 10% by volume.

More generally, the friction material according to the invention exhibits the following percentage composition calculated by volume relative to the total volume:

| ORGANIC FIBERS | 1-10 |
| INORGANIC FIBERS | 1-20 |

-continued

| RESIN | 5-30 | |
| CARBON MATERIALS | 1-15 | |
| OTHER METALS | 0-10 | (zinc among others) |
| INORGANIC SULFURS | 0-15 | |
| INORGANIC SALTS | 0-30 | |
| INORGANIC OXIDES | 1-30 | |
| SILICATES | 1-20 | |
| TITANATE | 1-25 | |
| STAINLESS STEEL | 1-10 | |

The friction material of the invention is generally produced by uniformly mixing the specific quantities of fibrous base described above together with the binder and filler in a suitable mixer, for example, a Henschel, Loedige or Eirich mixer.

The pressing is carried out at a temperature between 130 and 200° C. (266 and 392° F.) at a pressure from 150 to 1500 Kg/cm2 (14.7-147.1 MPa) for a time between 3 and 10 minutes or preforming the mixture in a die and thereafter pressing at a temperature from 130 to 180° C. (266 to 356° F.) at a pressure from 150 to 500 kg/cm$^2$ (14.7-49 MPa) for a period of from 3 to 10 minutes.

The resulting pressed item is typically post-cured via thermal treatment at 150-250° C. (302-482° F.) for from 2 to 10 hours, then spray-painted or powder-coated, oven-dried and possibly machined where necessary to produce the final product.

The friction material of the invention can be utilized in applications such as disk linings, shoes and pads for brakes for automobiles, trucks, railroad cars and other various types of vehicles and industrial machines or in clutch disks.

BRIEF DESCRIPTION OF THE DRAWINGS

The present invention will now be described in more detail with reference to the following practical and comparative examples and with reference to FIGS. 1 to 4 of the appended drawings, which illustrate in graphical form the results of braking performance tests.

DETAILED DESCRIPTION

The examples and comparative examples are recorded for the purpose of illustration and are not intended to limit the invention.

EXAMPLES

The components shown in table 1 were uniformly mixed in a Loedige mixer and pressed in a die under a pressure of 200 kg/cm$^2$ (19.6 MPa) for 3 minutes at a temperature of 160° C. (320° F.). then cured with 5 hours of heat treatment at 200° C. (392° F.), producing a friction material according to the invention, indicated as "Formula 2," the comparative material, indicated as "Formula 3," having a composition substantially identical to the material of the invention, but free of stainless steel fiber, replaced by an equal quantity of barium sulfate, the comparative material, indicated as "Formula 4," having a composition identical to the one according to "Formula 2" but in which the potassium titanate was substituted with baryte, and the comparative material according to the known art, indicated as "Formula 1," containing copper.

TABLE 1

| | Formula 1 | Formula 2 | Formula 3 | Formula 4 |
|---|---|---|---|---|
| Aramid fibers | 5.4 | 5.1 | 5.0 | 5.4 |
| Friction powder | 11.7 | 7.8 | 7.5 | 11.5 |
| Rubber powder | 2.5 | | | |
| Graphite | 5.7 | 9.6 | 9.3 | 10.2 |
| Phenolic resin | 18.1 | 23.3 | 22.6 | 17.9 |
| Ca/Mg silicate | 14 | 8.3 | 8.0 | 8.8 |
| Inorganic fiber | | 5.5 | 5.3 | 5.9 |
| Barium sulphate | 24.8 | 4.41 | 10.8 | 19.7 |
| Bi/Fe/Sn sulfide | 2.7 | 2.8 | 2.7 | 3.0 |
| Zirconia | 8.2 | 12.9 | 12.4 | 13.7 |
| Titanate | | 16.9 | 16.4 | |
| Copper powder | 6.9 | | | |
| Stainless steel fibers | | 3.7 | | 3.9 |
| Zinc fiber | | | | |
| TOTAL | 100.00 | 100.00 | 100.00 | 100.00 |

The material obtained in this way was mounted on a vehicle and tested with a bench test according to the following cycle:

Test setup: 96 brakings from 80 to 30 km/h (49.7 to 18.6 mph)

Characteristic value: 8 brakings from 80 to 40 Km/h (49.7 to 24.8 mph)

High speed fade test: 5 brakings from 168 to 80 km/h (104.4 to 49.7 mph) and 5 brakings from 168 to 5 km/h (104.4 to 3.1 mph)

High speed fade test: 9 brakings from 168 to 80 Km/h (104.4 to 49.7 mph)

Characteristic value: 8 brakings from 80 to 40 Km/h (49.7 to 24.8 mph)

The results obtained are illustrated in the graphics of FIGS. 1-4.

Figure 1:
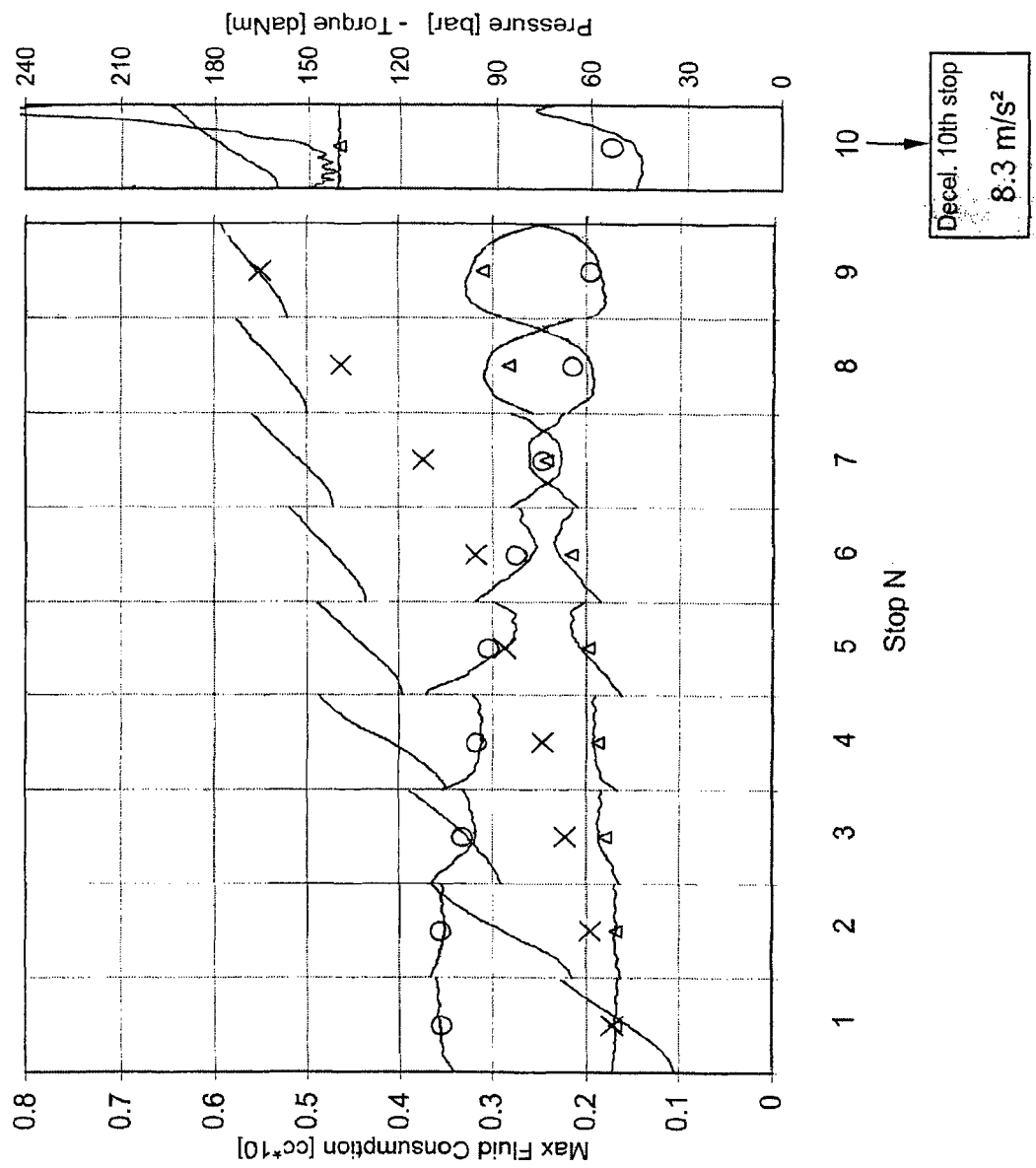

In particular, FIG. 1 refers to the "Formula 3" comparative material free of both copper and its compounds/alloys and stainless steel fibers.

Figure 2:
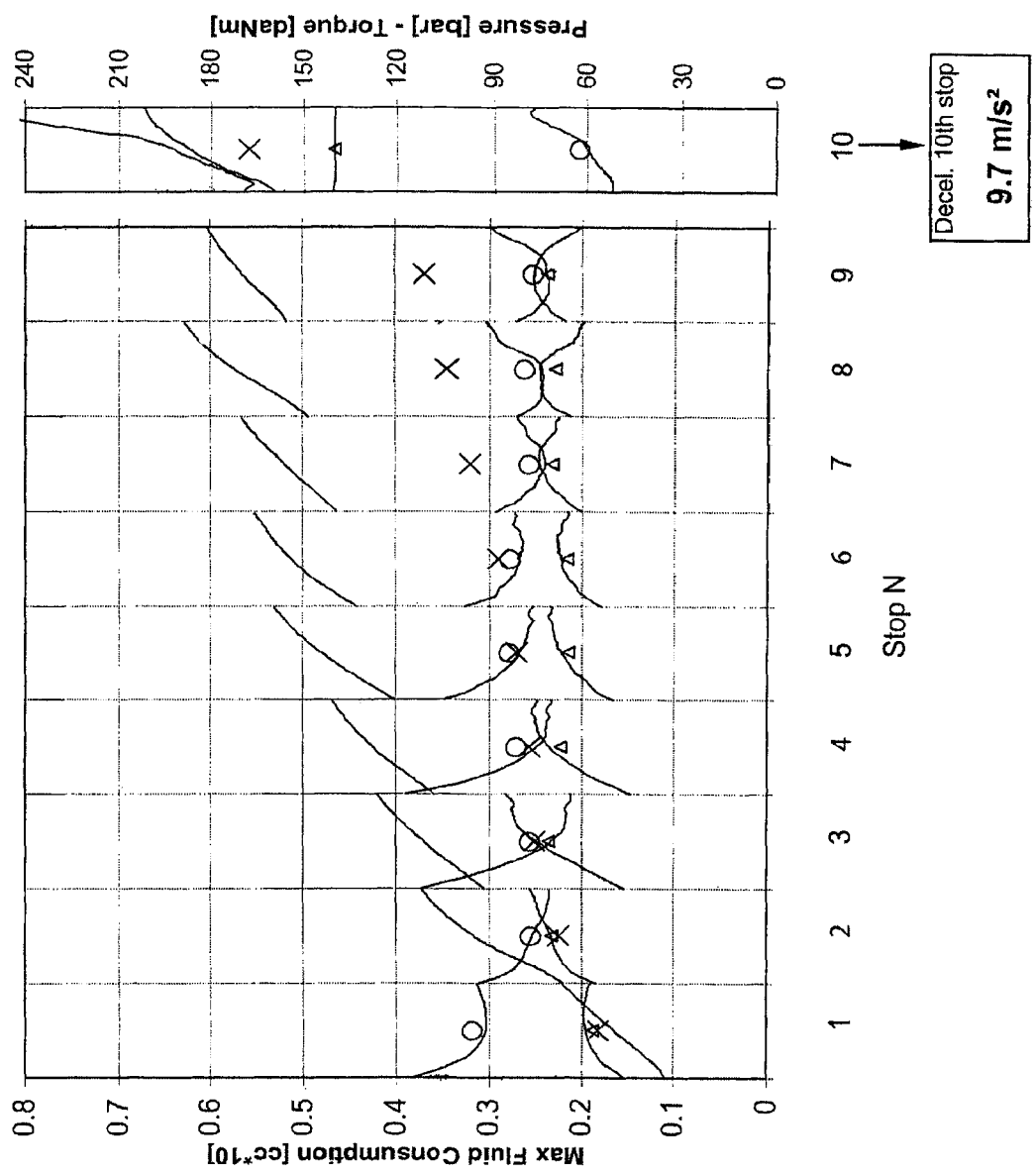

FIG. 2 refers to the material of the "Formula 1" state of the art containing copper.

Figure 3:
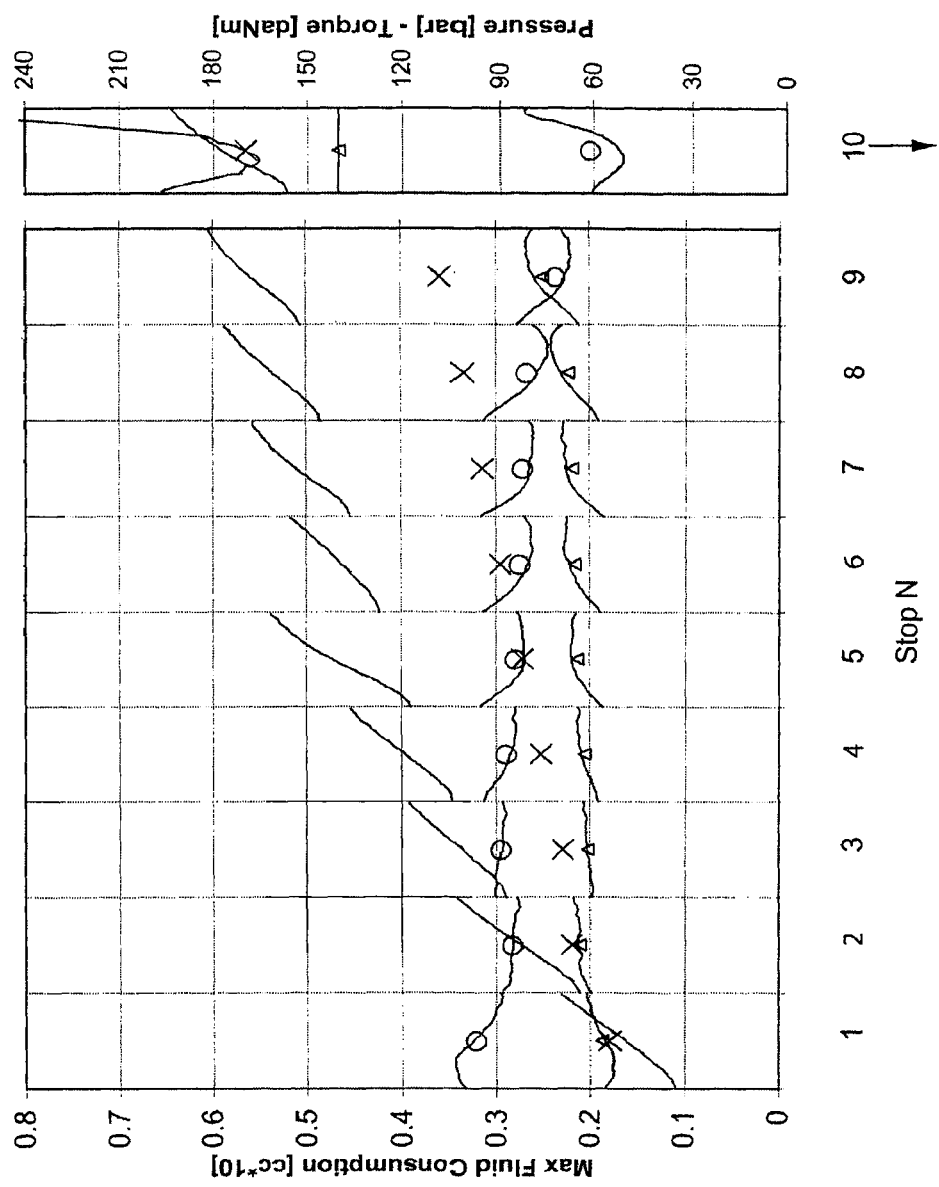

FIG. 3 refers to the "Formula 2" material of the invention free of copper but containing stainless steel fiber together with potassium titanate and zirconia.

Figure 4:
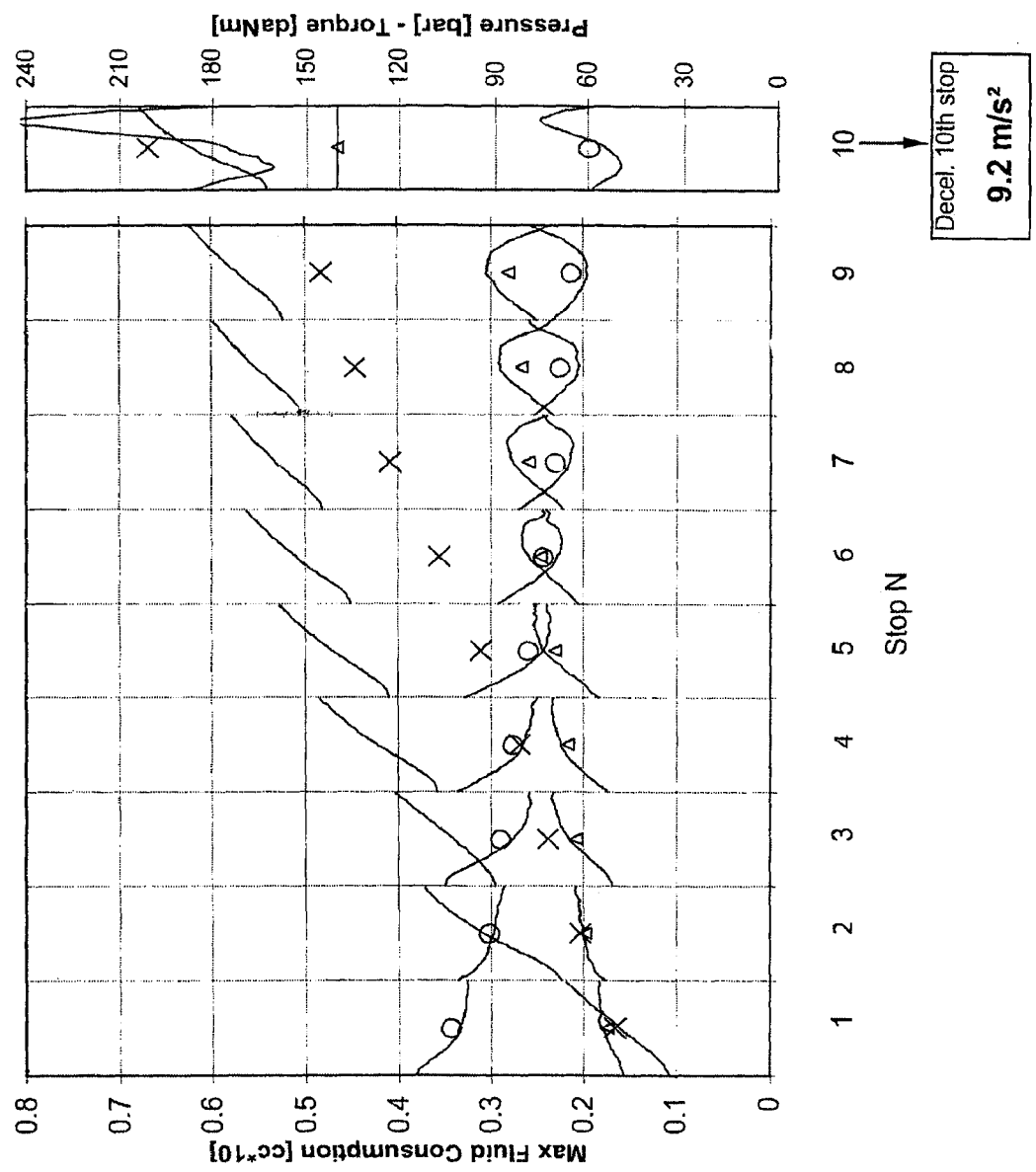

FIG. 4 refers to the "Formula 4" comparative materials free of copper and containing stainless steel fibers, but free of titanate.

As is evident, observing in particular the curves described by the points signed with a cross and representing the consumption of oil during braking, the friction material according to the invention, free of copper, has a braking performance comparable overall to that of the material known in the art, containing approx. 6.9% in volume of copper. Vice versa, the "Formula 3" comparative material, free of both copper and stainless steel, while still having an overall assimilable composition, for the other components, to the material of the invention, exhibits an oil consumption during braking that grows exponentially, which means that the braking of the vehicle gets progressively "longer," behavior generally unacceptable on a vehicle.

From a comparative examination of FIG. 4 with the other figures, it is further evident how the material having the combination of stainless steel fibers with potassium titanate (FIG. 3) performs decidedly better than the same material, with stainless steel in place of the copper, but free of the potassium titanate. Nevertheless, the latter "formula 4" material, exhibits a behavior decidedly better than that of the "formula 3" control material, inasmuch as, while exhibiting greater oil consumption than that of the "formula 1" state of the art material, it does not exhibit the exponential trend that the "formula 3" control material instead exhibits, indicating that the presence of the specifically selected stainless steel fibers, even by themselves and in the absence of copper and its alloys, renders an innovative result.

The objectives of the invention are therefore fully achieved.

The invention claimed is:

1. A non-asbestos organic (NAO) friction material comprising:
   a fibrous base comprising:
   inorganic fibers;
   organic fibers; and
   between 1 and 10% by volume of stainless steel fibers, based on the total volume of the non-asbestos organic friction material;
   a filler selected from the group consisting of: calcium silicate, rock wool, calcium carbonate, barium sulfate, calcium hydroxide, calcium fluoride, slaked lime, talc, mica, and vermiculite and combinations thereof;
   optional metal oxides, wherein the only optional metal oxides in the non-asbestos organic friction material are selected from the group consisting of magnesium oxide, molybdenum trioxide, iron oxide and combinations thereof;
   an organic binder, and
   between 1 and 25% by volume of a system of fibrous oxides consisting of:
   i) potassium hexatitanate, and
   ii) zirconia,
   wherein a ratio between the percentage content by volume of the zirconia and potassium hexatitanate in the system of fibrous oxides is between 1:1.3 and 1:2, and wherein
   a ratio between the percentage content by volume of stainless steel fibers to the sum total of the zirconia and potassium hexatitanate in the system of fibrous oxides is between 1:7 and 1:8,
   wherein the stainless steel fibers in the fibrous base have a total fiber length between 0.5 and 1.5 mm and a fiber diameter of between 40 and 150 microns and wherein the non-asbestos organic friction material is free from copper, copper compounds or copper alloys.

2. The non-asbestos organic friction material according to claim 1, further comprising from 0% to 10% by volume of solid lubricants, based on the total volume of the non-asbestos organic friction material.

3. The non-asbestos organic friction material according to claim 1, further comprising between 2% and 15% by volume of the total composition of the non-asbestos organic friction material of at least one of graphite or coke.

4. The non-asbestos organic friction material according to claim 1, wherein the fibrous base has a total fiber length between 0.5 and 1.5 mm and a fiber diameter of between 40 and 150 microns.

5. The non-asbestos organic friction material according to claim 1, comprising a composition based on the total volume of the non-asbestos organic friction material, as follows:
   1-10% by volume organic fibers;
   1-20% by volume inorganic fibers;
   5-30% by volume resin;
   1-15% by volume carbon materials;
   0-10% by volume other metals;
   0-15% by volume inorganic sulfurs;
   0-30% by volume inorganic salts;
   1-30% by volume inorganic oxides;

1-20% by volume silicates;
1-25% by volume titanates; and
1-10% by volume stainless steel.

6. The non-asbestos organic friction material according to claim 1, wherein the binder is a phenolic resin and from 2 to 30% by volume relative to the total volume of the non-asbestos organic friction material.

7. The non-asbestos organic friction material according to claim 1, further comprising zinc fibers in a total quantity of between 1 and 10% by volume.

8. The non-asbestos organic friction material according to claim 7, wherein the zinc fibers have a total length of between 0.2 and 1.5 mm and a total diameter of between 50 and 250 microns.

9. The non-asbestos organic friction material according to claim 1, wherein the filler comprises between 2-40% by volume based on the total composition of the non-asbestos organic friction material.

10. The non-asbestos organic friction material according to claim 1, wherein the friction material is used for producing brake pads or brake shoes for vehicles or for other equipment including clutch disks.

\* \* \* \* \*